United States Patent
Browning

[15] 3,702,937
[45] Nov. 14, 1972

[54] MOTION DETECTOR
[72] Inventor: Iben Browning, Sunnyvale, Calif.
[73] Assignee: Microlens, Inc.
[22] Filed: May 1, 1968
[21] Appl. No.: 725,795

[52] U.S. Cl..................................250/210, 350/170
[51] Int. Cl...............................................H01j 39/12
[58] Field of Search............340/227, 233, 258, 228; 350/170, 286; 356/111; 250/204, 206, 209, 210, 216, 220, 221, 237

[56] References Cited
UNITED STATES PATENTS

| | | |
|---|---|---|
| 2,016,036 | 10/1935 | Fitz Gerald.................250/221 |
| 2,527,896 | 10/1950 | Thirard et al...............350/170 |
| 3,344,700 | 10/1967 | Brake......................250/237 X |
| 3,354,311 | 11/1967 | Vali et al. ...............250/210 X |
| 3,444,384 | 5/1969 | Horeczky................250/204 X |

*Primary Examiner*—Roy Lake
*Attorney*—Limbach, Limbach & Sutton

[57] ABSTRACT

A motion detector is disclosed wherein an image of the surveyed field is divided by a planar array of Fresnel biprisms into two portions focused on separate photocells. The photocells are incorporated in a balanced bridge circuit having a signal device connected between the null points of the bridge. Differential lighting from a moving object unbalances the bridge activating the signal device.

4 Claims, 1 Drawing Figure

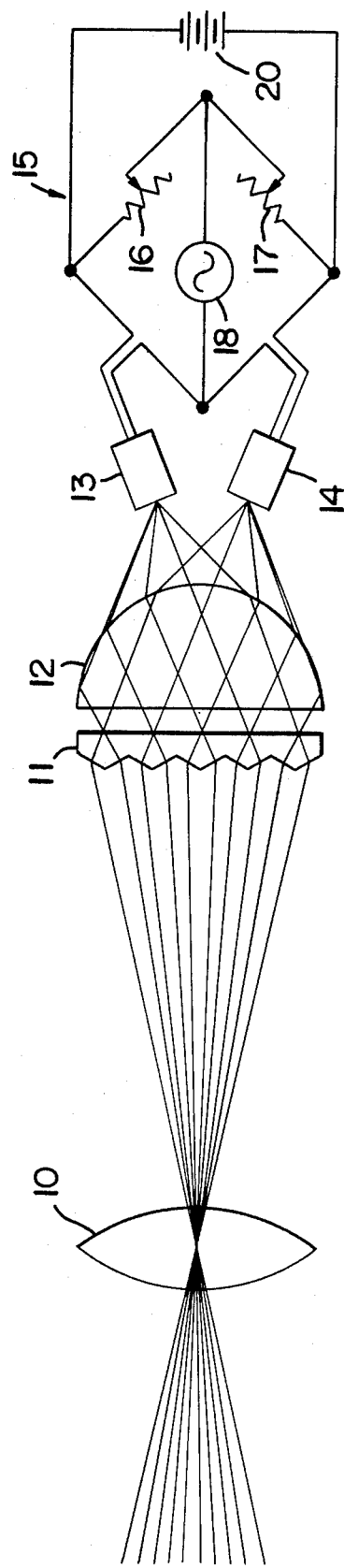

MOTION DETECTOR

This invention relates to a new and improved motion detector useful for indicating the motion of an object in a surveyed field.

It is an object of the present invention to provide a new and improved motion detector which generates a signal upon motion of an object in a surveyed field as a result of the differential lighting produced by the moving object in formed images of the surveyed field.

Another object of the invention is to provide a motion detector which is sensitive to differential lighting produced by motion of an object in a surveyed field yet which is overall insensitive to uniform changes of lighting in the surveyed field.

In order to accomplish this result, the present invention contemplates dividing the wave front of a formed image of the surveyed field by a planar array of Fresnel biprisms into two portions and focusing the two portions of the formed image onto separate photocells. The invention further contemplates incorporating the separate photocells in a balanced bridge circuit having a signal device connected between the null points of the bridge circuit. The circuit is arranged so that differential lighting of the surveyed field as produced by a moving object unbalances the bridge circuit activating the signal device, while the bridge circuit remains balanced during uniform changes in the lighting across the surveyed field such as produced by the diurnal progression of natural lighting.

Other objects, features and advantages of the present invention will become apparent in the following specification and accompanying drawing in which the optical train of a motion detector embodying the present invention is shown in side cross section and the bridge circuit shown diagrammatically.

In the illustrated embodiment of the present invention there is provided an objective lens 10 for forming an image of the surveyed field at the image plane of the lens where is positioned a planar array of Fresnel biprisms 11. As shown in the FIGURE, the planar array comprises a row of substantially adjacent Fresnel biprisms. Each biprism divides the incident wave front into two portions transmitted in different directions as a result of differential refraction through the biprism. A plano-convex lens 12 is provided adjacent the row of biprisms adapted to gather the light refracted and transmitted through one side of each of the biprisms and focus it on a first photoelectric cell 13 and likewise gather the light refracted and transmitted through the other side of each biprism and focus it on a second photocell 14. The photocell may be a photoelectric cell or photosensitive device whose resistance varies with a variation of incident light. The photosensitive devices 13 and 14 are connected to adjacent legs of a bridge circuit 15 provided with resistances 16 and 17 on adjacent opposite legs. At least one of the resistances 16 and 17 is a variable resistance for adjusting the balance of the bridge. A signal device 18 is connected between the null corners of the bridge circuit while a bias voltage source 20 is connected between the other two corners of the bridge circuit. The signal device may be a suitable alarm or light which may be further connected through a relay.

The bridge will become unbalanced and the signal activated only upon differential changes in the resistance provided by photocells 13 and 14 in the bridge circuit. Thus, if there is a differential increase in the outputs of the photocells, a differential decrease in the output of the photocells, or an increase in the output of one photocell and a decrease in the output of the other photocell, the bridge circuit will become unbalanced. On the other hand, a uniform increase or decrease in the output of the photocells will maintain the balance of the circuit. Thus, motion of an object in the surveyed field producing differential lighting on the photocells 13 and 14 and thereby a differential output from the photocells, will result in activation of the signal device 18. On the other hand, uniform changes in the surveyed field such as produced by the diurnal progression of natural lighting will leave the bridge circuit in a balanced state.

Although only one embodiment of the present invention has been shown and described, other adaptations and modifications would be apparent without departing from the true spirit and scope of the following claims.

What is claimed is:

1. An image motion detector comprising: lens means adapted to form an image of a surveyed field in a plane spaced from said lens means; a planar array of biprisms positioned substantially in the image plane of said lens means and adapted to divide the wave front of an image formed by said lens means into two portions; first and second photoelectric cells spaced from said planar array of biprisms; and second lens means positioned adjacent the planar array of biprisms and adapted to focus the divided image portions on the first and second photoelectric cells respectively.

2. An image motion detector as set forth in claim 1 wherein the first and second photoelectric cells are connected respectively in adjacent legs of a balanced bridge circuit.

3. An image motion detector comprising: image forming means adapted to form an image of a surveyed field in a plane spaced from said image forming means; a planar row of adjacent biprisms positioned in the image plane of said image forming means; second image forming means positioned adjacent the planar row of biprisms and adapted to focus light transmitted through said planar row of biprisms; and first and second photoelectric cells positioned to receive light focused by said second image forming means.

4. An image motion detector as set forth in claim 3 wherein said first and second photoelectric cells are incorporated in adjacent legs of a balanced bridge circuit.

* * * * *